(12) United States Patent
Tatat et al.

(10) Patent No.: US 7,444,051 B2
(45) Date of Patent: Oct. 28, 2008

(54) CONDUCTOR MODULE, ESPECIALLY OF AN OPTICAL FIBRE TYPE, HAVING LONGITUDINAL IMPENETRABILITY AND CONTROLLED RELATIVE SLIPPAGE, AND ASSOCIATED METHOD OF PRODUCTION

(75) Inventors: Olivier Tatat, Bleriot-Plage (FR); Alain Avrons, Calais (FR); Jean-Pierre Bonicel, Rueil Malmaison (FR)

(73) Assignee: Draka Comteq B.V. (NL)

( * ) Notice: Subject to any disclaimer, the term of this patent is extended or adjusted under 35 U.S.C. 154(b) by 81 days.

(21) Appl. No.: 11/015,672

(22) Filed: Dec. 20, 2004

(65) Prior Publication Data
US 2005/0169587 A1    Aug. 4, 2005

(30) Foreign Application Priority Data
Dec. 19, 2003    (FR) .................................. 03 14984

(51) Int. Cl.
*G02B 6/44*    (2006.01)

(52) U.S. Cl. .................. 385/102; 385/100; 385/101; 385/109

(58) Field of Classification Search ......... 385/100–102, 385/105, 106, 109, 110, 112
See application file for complete search history.

(56) References Cited

U.S. PATENT DOCUMENTS

| | | | |
|---|---|---|---|
| 4,370,023 A | 1/1983 | Lange et al. | |
| 4,757,100 A | 7/1988 | Wichelhaus et al. | |
| 5,671,312 A | 9/1997 | Jamet | |
| 6,278,824 B1 | 8/2001 | Bosisio et al. | |
| 2003/0049002 A1* | 3/2003 | Bosisio et al. | ............... 385/109 |

FOREIGN PATENT DOCUMENTS

| | | |
|---|---|---|
| DE | 195 16 970 A1 | 11/1996 |
| EP | 0 811 864 A1 | 12/1997 |
| EP | 0 702 801 B1 | 5/1998 |
| EP | 0 916 980 A1 | 5/1999 |
| EP | 0 933 786 A1 | 8/1999 |
| EP | 0 969 301 A2 | 1/2000 |

OTHER PUBLICATIONS

Patent Abstracts of Japan, 03256014, Nov. 14, 1991; Furukawa Electric Co., Ltd., Optical Cable.
Polydecent-based Systems for Use in Fiber Optic Cable Floods: Distinct Enhanced Stability Regimes for Low and high Molecular Weight Base Fluids; Coolbaugh, et al., pp. 437-474.

* cited by examiner

*Primary Examiner*—Frank G Font
*Assistant Examiner*—Mary A El Shammaa
(74) *Attorney, Agent, or Firm*—Sughrue Mion, PLLC

(57) ABSTRACT

A conductor module (M) comprises a jacket (E) tightly accommodating, in the manner of tubing, at least two flexible conductors (C). The conductors (C) are coated with a small amount of oil (H) having a viscosity strictly less than 100 millipascal second (mPa.s) so as to allow control of the slippage of the jacket (E) in relation to the conductors (C) and longitudinal impenetrability inside the module (M).

17 Claims, 1 Drawing Sheet

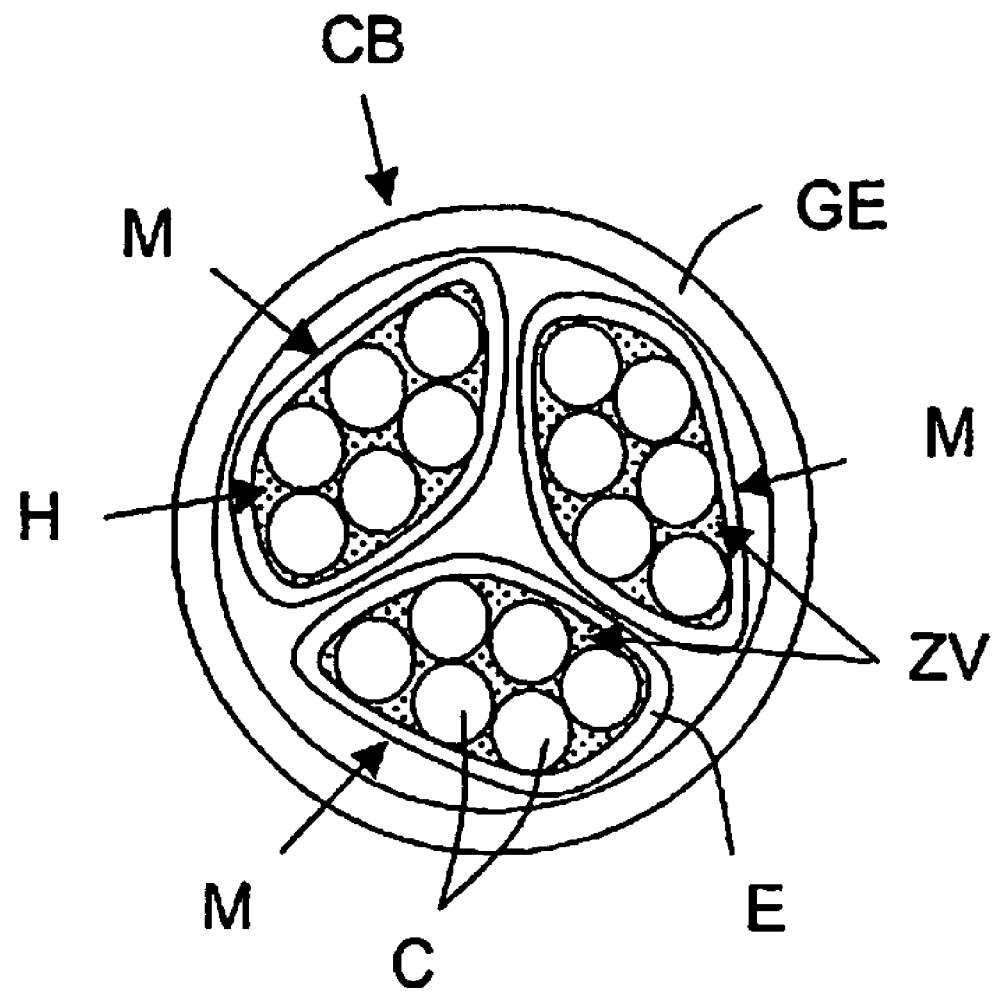
Figure

CONDUCTOR MODULE, ESPECIALLY OF AN OPTICAL FIBRE TYPE, HAVING LONGITUDINAL IMPENETRABILITY AND CONTROLLED RELATIVE SLIPPAGE, AND ASSOCIATED METHOD OF PRODUCTION

The invention relates to the area of conductor modules.

A conductor module is understood herein to be an assembly consisting of a so-called "tubing" jacket, preferably of low thickness, tightly accommodating at least two flexible conductors such as optical fibres or electrical wires.

When conductors are tightly accommodated inside a tubing jacket, especially of low thickness, there always remain voids (or interstices), on the one hand between the conductors and on the other hand between the conductors and the jacket. In other words, the conductor modules include "free" regions.

In applications which require good longitudinal impenetrability inside the conductor modules, the voids must be filled in the best possible manner so that water penetration is blocked within a few metres, for which there are at least three known techniques.

A first technique consists in coating the conductors with a filler grease (or gel). Because of the relatively high viscosity of the grease (of the order of 5,000 to 10,000 millipascal second (mPa.s)) it is difficult to deposit a low thickness of grease over the assembly of conductors when the modules are being produced. The presence of such a layer of grease at the conductor/jacket interface means that the jacket slides relatively easily in a longitudinal direction with respect to the conductors. Consequently, when the jacket of a module "rubs" against an outside element, for example when the module is passing through a die or an installation grid in production, folds (or "bamboo knots") will form in the jacket as a result of relative slippage of the jacket in relation to the conductors accommodated therein.

A second technique consists in dusting the conductors with a swelling powder. This makes it possible to avoid using a lubricating material, but access to the conductors by tearing the jacket by means of pinching and pulling is made difficult.

A third technique, described in the patent document EP 0 702 801, consists in coating the conductors with an oil having a viscosity between 100 millipascal second (mPa.s) and 5,000 millipascal second (mPa.s) inclusive. In that case, the oil replaces the grease, which, when access to the conductors is desired, requires multiple manipulations—especially a degreasing operation—whereby they can be damaged. Moreover, the viscosity of the oil in that case is so selected that it does not run out to an excessive degree when access to they conductors is desired. Because of the relatively high viscosity of the, oil it can happen that it is applied in a substantial thickness in the afore-mentioned situations so that the jacket slides in relation to the conductors, thereby causing bamboo knots. The use of grease or oil of high viscosity moreover limits the speed of production.

In view of the fact that no known technique is completely satisfactory, the invention is aimed at improving the situation.

To that end the invention proposes a conductor module comprising a tubing jacket, for example of low thickness, tightly accommodating at least two flexible conductors such as, for example, optical fibres or electrical wires, coated with a small amount of oil having a viscosity strictly less than 100 millipascal second (mPa.s).

By using oil of very low viscosity it is possible for the oil to be applied in a small amount so as to control the slippage of the jacket in relation to the conductors whilst ensuring good longitudinal impenetrability inside the module.

The word "control" herein denotes the action of limiting or of increasing in accordance with requirements so as to obtain, subject to uncertainties, a selected relative slippage.

The oil has a viscosity preferably between about 25 millipascal second (mPa.s) and about 85 millipascal second (mPa.s) inclusive, and more preferably equal to about 75 millipascal second (mPa.s).

Furthermore, a "small amount of oil" is understood herein to be an amount capable of ensuring a level of filling of the free regions of between about 10% and about 40% inclusive.

The oil is preferably selected from silicone-based oils, paraffin oils and petroleum-based oils.

The invention likewise proposes a cable comprising at least two conductor modules of the type described hereinabove.

The invention moreover proposes a method of producing a conductor module of the kind described hereinabove. This method comprises, on the one hand, coating at least two flexible conductors with a small amount of an oil having a viscosity strictly less than 100 millipascal second (mPa.s) and, on the other hand, extruding a tubing jacket, for example of low thickness, around the conductors so as to accommodate them tightly.

Other characteristics and advantages of the invention will emerge from consideration of the detailed description hereinbelow and of the accompanying drawing, in which the single FIGURE shows, in schematic form, a cross section through a cable comprising several conductor modules according to the invention. The accompanying drawing can serve not only to complement the invention but also to contribute to its definition, where applicable.

The object of the invention is to enable the production of conductor modules having internal longitudinal impenetrability and wherein the capacity for longitudinal slippage of the jacket in relation to the conductors is controlled.

As is illustrated in the single FIGURE, a conductor module comprises a tubing jacket E, also referred to as a sheath, defining a cavity in which there are tightly accommodated at least two flexible conductors C, for example produced in the form of optical fibres or electrical wires.

The tubing jacket E is preferably of low thickness. For example, that thickness is between about 0.1 mm and about 0.2 mm inclusive.

Hereinbelow it will be assumed, by way of non-limiting example, that the conductors M are optical fibres and that consequently the conductor modules M are optical modules.

An optical module M of such a kind, can, as shown, be installed together with at least one other module M inside an outer sheath GE, the entirety constituting a cable CB, in this case of an optical type.

In the example shown, the cable CB comprises three optical modules M but it could comprise only two or more than three thereof.

Furthermore, in the example shown, the three optical modules M each comprise six optical fibres C. However, the invention is not limited to that number. Each optical module M can in fact comprise a number of optical fibres C that is of any desired magnitude provided that the number is greater than or equal to two.

In order to ensure longitudinal impenetrability inside each optical module M whilst allowing control of slippage of the jacket E in relation to the optical fibres C, the invention proposes coating each optical fibre C with a small amount of oil H having a viscosity strictly less than 100 centipoise (or millipascal second (mPa.s)).

That condition relating to the viscosity is understood to apply to a temperature equal to 20°+2°. It is nevertheless preferable for the viscosity of the oil not to vary too significantly with temperature. Furthermore, it is important that the selected oil H is not capable of adversely affecting, in significant manner, the jacket E or the optical fibre C, and especially its protective coating (or its sheath when that coating is not present). For example, the variation in physical properties of the coating and of the jacket E which is caused by the oil H must be less than +25%, after ageing.

A "small amount of oil" is understood to be an amount which is sufficient, on the one hand, to coat the surface of the optical fibres and to fill, at least partially, the voids ZV (or interstices) which remain inside the jacket E once the optical fibres C have been accommodated therein and, on the other hand, not to cause spontaneous outflow of the oil H from the jacket E.

The oil H which initially coats the optical fibres C comes to fill, at least partially, the voids ZV, especially by means of capillary action, thereby ensuring longitudinal impenetrability inside the optical module M. Furthermore, the very low viscosity of the oil used allows the fibres to be coated whilst limiting the amount of the oil, thereby allowing the slippage of the jacket E in relation to the optical fibres C to be limited. In other words, selection of the viscosity value (which allows the amount of oil to be controlled) enables the capacity of the jacket E for slippage in relation to the optical fibres C to be controlled.

The amount of oil H is selected so as to ensure a level of filling of the free regions of between about 10% and about 40% inclusive, preferably between about 15% and about 35%. For example, for a module M comprising six or twelve optical fibres C there is obtained a level of filling of the free regions of about 20% for an amount of silicone oil on an optical fibre of the order of 0.002 g/m (which corresponds to an oil thickness of about 5 microns on the surface of the fibre).

Numerous oils H can be, used in order to meet the aforementioned conditions. However, it is nevertheless preferable for the oil to be selected from silicone-based oils such as, for example, the oil Rhodorsil 47 V 50 from the company Rhodia, paraffin oils and petroleum-based oils.

Furthermore, it is preferable for the viscosity value of the oil H to be between about 25 centipoise (or mPa.s) and about 85 centipoise (or mPa.s) inclusive. Even more preferably, the viscosity value is equal to about 75 centipoise (or mPa.s).

In order to allow production of the optical modules described hereinabove, the invention also provides a method consisting firstly of coating the optical fibres C (or flexible conductors) with a small amount of an oil H which meets the viscosity condition described hereinabove (strictly less than 100 mPa.s). That may be accomplished by moving the group (or bundle) of optical fibres C towards an extruder head having the function of generating the tubing jacket E and passing said group, just before said extruder head, between two pads which are impregnated with oil by means of a supply device, for example of a dropper type.

More specifically, in order to control the amount of oil whilst reducing it to a minimum, the optical fibres C are preferably separated by a comb system at the entry to the pads. In that manner it is ensured that the entire surface of the optical fibres C is "moistened" with the oil by contact between the two pads, which are positioned one above the other and impregnated with oil by a dropper device. The amount of oil is minimized by wiping between the two pads, which are in contact with one another. The length of the passage between the pads and the pressure of one pad on the other can be adjusted in order to match the device to the desired result (that is to say an amount of oil corresponding to a selected thickness, for example of the order of 5 microns).

Alternatively, the optical fibres C, having been separated by the comb, enter a device applying a mist of oil and they are then wiped off on a pad previously moistened with the same oil. A method of such a kind can allow the optical fibres C to be coated to excess, even at high speed, with wiping off by the pads so as to "calibrate" the amount of oil deposited.

The group of optical fibres C then enters the extruder head, where extrusion of the tubing jacket E is then carried out. The optical fibres are then tightly accommodated in the extruded tubing jacket E and, at the exit from the extruder head, an optical module M is made available.

As indicated hereinabove, the extrusion is of the tubing type, which is to say that the jacket is "deposited" on the bundle of optical fibres C.

When the bundle of optical fibres C is coated with a large amount of grease, as is the case in the prior art, there results a substantial thickness of grease (a notional layer) promoting slippage of the optical fibres C in relation to the jacket E of the module M. In contrast, when coating is carried out using an oil of low viscosity, in accordance with the invention, the layer deposited is of low thickness, and the slippage is limited. The free region is then slightly reduced, which allows the amount of oil necessary for impenetrability to be reduced with respect to that necessary in the presence of a grease of high viscosity.

During the extrusion phase, the group of optical fibres C can be subjected to rotary movement in order to have a final structure of a helical type.

A method of such a kind can allow optical modules M to be produced at a speed of between about 100 m/min and about 1,000 m/min inclusive.

The invention is not limited to the embodiments of conductor modules, cables and module production methods described hereinabove solely by way of example but encompasses any variant that the person skilled in the art can envisage within the scope of the claims hereinbelow.

The invention claimed is:

1. Conductor module (M) comprising:
   a jacket (E) tightly accommodating at least two flexible conductors (C), wherein said conductors (C) are coated with a small amount of oil (H) having a viscosity less than 100 millipascal second (mPa.s) at a temperature between 18° C. and 22° C. so as to allow control of the slippage of said jacket (F) in relation to said conductors (C) and longitudinal impenetrability inside said module (M).

2. Module according to claim 1, wherein said tubing jacket is of low thickness.

3. Module according to claim 1, wherein that said oil (H) has a viscosity of between about 25 millipascal second (mPa.s) and about 85 millipascal second (mPa.s) inclusive at said temperature.

4. Module according to claim 3, wherein said oil (H) has a viscosity equal to about 75 millipascal second (mPa.s) at said temperature.

5. Module according to claim 1, wherein that said amount of oil (H) is selected so as to ensure a level of filling of the free regions of between about 10% and about 40 inclusive.

6. Module according to claim 1, wherein said oil (H) is selected from a group comprising at least silicone-based oils, paraffin oils and petroleum-based oils.

7. Module according to claim 1, wherein said conductors (C) are optical fibres.

8. Module according to claim 1, wherein said conductors (C) are electrical wires.

9. Cable (CB), characterized in that it comprises at least two conductor modules (M) according to claim 1.

10. Method of producing a conductor module (M) comprising a tubing jacket tightly accommodating at least two flexible conductors, the method comprising the following steps:
- coating the at least two flexible conductors (C) with oil (H) having a viscosity less than 100 millipascal second (mPa.s) at a temperature between 18° C. and 22° C.; and
- extruding the tubing jacket (E) around said conductors (C) such that the coated conductors are tightly accommodated in said jacket to control slippage of said jacket relative to said conductors and to prevent penetration of moisture inside said module.

11. The method according to claim 10, wherein said tubing jacket is of low thickness.

12. The method according to claim 10, wherein that said oil (H) has a viscosity of between about 25 millipascal second (mPa.s) and about 85 millipascal second (mPa.s) inclusive at said temperature.

13. The method according to claim 12, wherein said oil (H) has a viscosity equal to about 75 millipascal second (mPa.s) at said temperature.

14. The method according to claim 10, wherein that said amount of oil (H) is selected so as to ensure a level of filling of the free regions of between about 10% and about 40 inclusive.

15. The method according to claim 10, wherein said oil (H) is selected from a group comprising at least silicone-based oils, paraffin oils and petroleum-based oils.

16. The method according to claim 10, wherein said conductors (C) are optical fibres.

17. The method according to claim 10, wherein said conductors (C) are electrical wires.

* * * * *